United States Patent Office 2,990,245
Patented June 27, 1961

2,990,245
METATHESIS OF BISMUTH PHOSPHATE PLUTONIUM CARRIER PRECIPITATE WITH AN ALKALI
Isadore Perlman, Berkeley, Stanley G. Thompson, Richmond, and Burris B. Cunningham, Berkeley, Calif., assignors to the United States of America as represented by the United States Atomic Energy Commission
No Drawing. Filed Apr. 30, 1947, Ser. No. 745,108
11 Claims. (Cl. 23—14.5)

This invention relates to a method of separating plutonium from contaminating elements and more specifically is concerned with a process for concentrating plutonium during separation from contaminating elements.

The word "plutonium" as used in this specification and claims refers to the element with atomic number of 94 and to compositions containing this element unless the context indicates the elemental or metallic form.

Plutonium is usually produced by the reaction of neutrons with uranium, a reaction ordinarily carried out in a pile. The uranium mass as removed from the pile is comprised principally of unreacted uranium, but there are very small amounts of neptunium, plutonium and radioactive fission products present. Neptunium is radioactive and has a half-life of only 2.3 days decaying to plutonium by beta ray emission. Substantially all of the neptunium in the uranium mass, therefore, may be converted to plutonium by suitable aging of the mass for a few weeks.

A common method of separating plutonium from the uranium and other contaminants contained in the uranium mass following aging, is the bismuth phosphate-lanthanum fluoride precipitation process. This process may be arbitrarily divided into four steps: (1) Extraction, in which plutonium and some fission products are separated from uranium and the bulk of the fission products; (2) Decontamination, in which plutonium is separated from the remaining fission products; (3) Concentration, in which the ratio of plutonium-to-carrier is increased sufficiently that the plutonium may be precipitated directly from solution; (4) Isolation, in which the plutonium solution is further concentrated.

In order to carry out the extraction step, the uranium mass after suitable aging is usually dissolved in a concentrated aqueous nitric acid solution, to produce a uranyl nitrate hexahydrate solution. This solution is then diluted with water to give a uranyl nitrate hexahydrate solution of about 20% concentration. This dilute solution is contacted with a suitable reducing agent to insure that all of the plutonium ions are in the quadrivalent state. Sulfuric acid or a soluble sulfate is also added to the solution to complex the uranyl ions and prevent their precipitation in the subsequent steps. A precipitate of bismuth phosphate is then formed in the solution and separated therefrom. This bismuth phosphate precipitate carries with it the plutonium and certain of the fission products, which form insoluble phosphates, particularly zirconium and niobium. In the decontamination step this bismuth phosphate carrier precipitate containing plutonium and phosphate insoluble fission products is dissolved in a concentrated inorganic acid, usually a 60% nitric acid, and the acid solution then diluted with water to about a 5 N acid solution. The plutonium ions are then oxidized to the hexavalent state in which state plutonium is soluble as the phosphate. A bismuth phosphate precipitate is formed in the oxidized solution and separated therefrom carrying with it the phosphate insoluble fission products. The hexavalent plutonium ions are then reduced to the quadrivalent state and the solution is diluted so that the acidity is approximately 1 N. A bismuth phosphate carrier precipitate is then formed in the solution and separated therefrom carrying with it the plutonium. This decontamination cycle may be repeated as often as necessary to insure complete separation of the plutonium and the fission products. Following the decontamination step, the concentration and isolation steps are carried out.

One of the disadvantages of the present method of separation is the large, dilute acid-to-plutonium ratio at which the plutonium precipitations in the decontamination step are carried out. The bismuth phosphate precipitate is difficultly soluble in nitric acid and it requires a large amount of concentrated nitric acid to dissolve the bismuth phosphate carrier cake. This volume of solution is then greatly increased by the necessity of carrying out the plutonium precipitation step from the solution at not appreciably greater than 1 N acid concentration. If the acid concentration is increased much above 1 N, there is a strong tendency for the acid to oxidize the plutonium to the +6 valence state in which state plutonium is soluble in the phosphate solution. Because of the difficulty of dissolving the bismuth phosphate and the necessity of diluting the acid solution to approximately 1 N, it is impossible to concentrate the plutonium in the decontamination step as it is presently carried out, since the amount of acid solution from which a plutonium precipitation step is carried out is approximately the same as the amount of acid solution in the preceding step.

A procedure whereby the bismuth phosphate cake would be dissolved to furnish a 1 N acid solution containing plutonium and the volume of the solution is smaller than the volume of the preceding 1 N acid solution from which the bismuth phosphate carrier cake was precipitated, would greatly increase the efficiency of the present bismuth phosphate separation process in many ways. For example, a much larger uranyl nitrate hexahydrate batch could be processed at one time. The amount of storage space required for the highly radioactive waste could be greatly reduced. The amount of separation process reagents used in steps subsequent to the decontamination cycle would be greatly decreased, and the waste losses of plutonium in the subsequent steps could be kept at a minimum by operating at the minimum practical volume. It can be readily seen that there are numerous other advantages.

One object of this invention is to effect a concentration of plutonium as a salt in an aqueous solution.

An additional object of this invention is to effect an improvement in the bismuth phosphate-lanthanum fluoride-plutonium separation process whereby the ratio of plutonium to plutonium carrier may be greatly increased in the extraction and decontamination steps of that process.

Still other objects of this invention will be apparent from the description and claims which follow.

We have discovered that a bismuth phosphate carrier precipitate containing plutonium may be converted into a bismuth hydroxide carrier precipitate containing plutonium, and that the hydroxide may be dissolved in a much smaller quantity of an inorganic acid than the bismuth phosphate carrier could be, and then diluted to furnish a dilute acid solution containing plutonium. Broadly, the process of our invention comprises the treatment in an aqueous medium of a bismuth phosphate carrier precipitate containing plutonium with a material of the group consisting of water-soluble, carbonates, bicarbonates, and hydroxides, and mixtures thereof, for the purpose of converting said bismuth phosphate carrier precipitate to the hydroxide, separating this hydroxide-plutonium carrier from the aqueous medium and dissolving said hydroxide carrier in a suitable acid, such as nitric acid.

Suitable reagents for the conversion of the bismuth phosphate to the hydroxide include the carbonates, bicarbonates, and hydroxides of the alkali metals. The hydroxides of these metals are preferable to the carbonates since they furnish the hydroxide ion directly upon dissolution of the compound in water, in contrast to the carbonates and bicarbonates, the anions of which add the hydrogen ion, thereby making available the hydroxide ions also produced, by dissociation of water.

Sodium hydroxide and potassium hydroxide may be used very efficiently in the process of this invention. Potassium hydroxide, however, has been found to be somewhat preferable to the sodium hydroxide, because the crystalline $Na_3PO_4.12H_2O$ formed during the metathesis step is somewhat slower in going into solution than the $K_3PO_4$. A metathesis reagent comprising a mixture of an alkali metal hydroxide and carbonate has been found to give very advantageous results, particularly so when the bismuth phosphate plutonium carrier is contaminated with greater than normal amounts of fission products, or contaminants normally encountered in plant operation, such as grease, oil, iron rust, etc.

The process of this invention may be used to convert the bismuth phosphate carrier to the bismuth hydroxide plutonium carrier where the plutonium is present in the carrier in a wide range of proportions ranging from tracer amounts up to amounts at which the plutonium might be precipitated directly from the solution in which the carrier is dissolved. It has been found, however, that at the higher ratios of plutonium-to-bismuth phosphate carrier, precipitation losses of plutonium are somewhat less than at the lower ratios. Laboratory runs have shown greater than 97% phosphate removal from the bismuth phosphate-plutonium carrier cake, with less than 2% product loss in the KOH supernatant when the plutonium was present in tracer concentrations, and only 0.4% plutonium loss when the plutonium was present in a concentration equivalent to 250 grams of plutonium per ton of neutron reacted uranium.

The process of this invention is extremely flexible as to the equipment in which it may be carried out; thus, the metathesis reaction may be carried out in a centrifuge bowl, in a tank reactor, or in any other suitable apparatus. In large scale operations, combinations of the centrifuge and tank reaction chambers have been found to be desirable. If the reaction is carried out in a tank, the tank should be fitted with a means for agitation, since, although agitation of the metathesis reactants is not essential, it has been found to be desirable in reducing the reaction time.

Various methods of contacting the bismuth phosphate carrier precipitate with the metathesis agent may be used. The bismuth phosphate cake may be added directly to a solution of the hydroxide, the bismuth phosphate cake may be slurried with water and added to the hydroxide solution, or solid hydroxide reagent may be added to a slurry of the bismuth phosphate carrier precipitate. An additional method of contacting the $BiPO_4$ carrier precipitate with the hydroxide which has been found very convenient in plant operation, comprises the introduction of a 25% KOH solution into the centrifuge bowl which contains the bismuth phosphate-plutonium carrier cake obtained from the extraction step. The metathesis reaction is then carried out by jogging the bismuth phosphate cake in the centrifuge bowl with the 25% KOH solution.

The temperature at which the metathesis reaction is carried out is not critical and suitable results have been obtained where the reactants are at room temperature. The reaction, however, usually goes to completion in somewhat shorter time if higher temperatures are used; thus temperatures in the range of 50–85° C. usually give the shortest reaction time.

The concentration of the metathesis reagent is not critical when a hydroxide is used and complete reaction is possible with only stoichiometric amounts of the hydroxide. The speed of reaction may be increased by using greater than stoichiometric amounts of the hydroxide, but not much is gained, however, by increasing the hydroxide concentration to more than four times the stoichiometric amount required for replacement of the phosphate by the hydroxide. The hydroxide concentration in the solution may vary widely with good results being obtained where the hydroxide has been in the range of from 1 M to 10 M.

The length of time required for the reaction to go to completion depends upon the temperature, the hydroxide concentration, and the amount of agitation used, as well as the amount of bismuth phosphate to be converted. These factors are interdependent in controlling the speed of the reaction so that a variation in any one of them may be accommodated by varying the other factors. The supernatant liquid containing the potassium or sodium phosphate may be separated from the metathesized bismuth hydroxide carrier precipitate by filtration, decantation, or centrifugation; but where the process is used on a large scale, it has been found preferable to separate the bismuth hydroxide carrier by centrifugation.

The bismuth hydroxide precipitate carries with it the quadrivalent plutonium ions almost quantitatively when it is separated from the mother liquor following metathesis. In addition to the plutonium, the carrier precipitate contains a small portion of radioactive fission product hydroxides and may contain some phosphate ion. It has been found that the presence of phosphate ion in the hydroxide precipitate is not a serious defect, however, unless the phosphate ion concentration exceeds 25% of the phosphate concentration theoretically possible. Should the phosphate present in the carrier precipitate exceed 25% of the theoretical phosphate concentration, the hydroxide carrier precipitate will be hard to dissolve in small quantities of nitric acid. In laboratory operations with reasonably efficient contacting of the alkali metal hydroxide and the bismuth phosphate reactants, metathesis is quite complete and the phosphate concentration in the bismuth hydroxide carrier cake is usually far below 25%. In plant operation, where the metathesis reaction may be less efficient than in the laboratory, the $PO_4$ ion carryover with the $Bi(OH)_3$ carrier may approach the practical limit of 25% of theoretical $PO_4$ ion. In this case it may be advisable to subject the $Bi(OH)_3$ cake to a washing operation to reduce the amount of $PO_4$ ion present. Water has been used quite successfully as the wash, but precautions must be taken when a water wash is used to prevent peptization of the bismuth hydroxide precipitate. Should peptization occur, it may be broken up by heating the solution or by recycling. A more satisfactory wash is found to be an approximately 2% KOH solution as this wash will not cause peptization.

The bismuth hydroxide carrier precipitate containing the plutonium and fission products may be readily dissolved in most inorganic acids particularly HCl, $H_2SO_4$ and $HNO_3$. Of those mentioned, however, $HNO_3$ is usually preferred in plant operations since it is not so corrosive to plant equipment as HCl and does not have a tendency to complex uranium ions to the extent that $H_2SO_4$ does. The bismuth hydroxide cake is therefore usually dissolved in a 60% or a 10 N aqueous nitric acid and following dissolution, the solution may be diluted to the concentration at which the succeeding steps in the bismuth phosphate process are to be carried out. The amount of nitric acid required to dissolve the bismuth hydroxide carrier precipitate is very much less than would be required to dissolve the bismuth phosphate carrier if the process of our invention were not used. In many cases as little as 10% as much nitric acid is required to dissolve the bismuth hydroxide carrier as would be required to dissolve the $BiPO_4$ carrier. The amount of nitric acid required to dissolve the bismuth hydroxide carrier precipitate varies somewhat, dependent upon the amount of fission products carried with the bismuth hydroxide precipitate. These fission products are comparatively insoluble, and, should a higher than normal concentration of fission products be present, a larger amount of nitric acid may be required to dissolve the bismuth hydroxide carrier precipitate.

Now that the process of this invention has been described, it may be illustrated by the following examples. Example I shows its operation on a laboratory scale with KOH as the metathesizing agent. Example II illustrates the use of NaOH as the metathesizing agent. Example III illustrates the use of the process of this invention on a plant scale with KOH as the metathesizing agent.

*Example I*

500 mg. of bismuth phosphate carrier precipitate containing 8 micrograms of plutonium was treated with 6.48 ml. of 15% KOH at room temperature, for one hour, with mechanical agitation to convert the phosphates to the bismuth and plutonium hydroxides. Following treatment, the bismuth hydroxide carrier precipitate was separated from the supernatant solution by centrifugation. The bismuth hydroxide carrier precipitate was then dissolved in 1.39 ml. of 10 N nitric acid. Counter analysis of the various reactants disclosed that 0.91% of the plutonium remained in the KOH supernatant solution. 98.09% of the plutonium was found in the dissolved bismuth hydroxide solution and 1% of the plutonium was unaccounted for.

*Example II*

500 mg. of bismuth phosphate carrier precipitate containing 8 micrograms of plutonium was treated with 1.37 ml. of 10 N NaOH for one-half hour, at room temperature, with agitation. The supernatant liquid was then separated from the bismuth hydroxide carrier precipitate by centrifugation and the precipitate dissolved in 2 cc. of 6 N nitric acid. Counter analysis disclosed that 95% of the plutonium had dissolved in the bismuth hydroxide-nitric acid solution.

*Example III*

A bismuth phosphate carrier precipitate comprising 74 lbs. of bismuth phosphate, 0.92 lb. of plutonium phosphate and 0.02 lb. of radioactive fission products contained in a 40-inch centrifuge bowl was contacted with 40 gals. of 25% KOH at room temperature. The centrifuge bowl was jogged intermittently for one hour and the supernatant liquid then separated from the bismuth hydroxide carrier cake by centrifugation. The bismuth hydroxide carrier cake was then washed four times with 40 gals. of water each time. Following the last wash the bismuth hydroxide cake was removed from the centrifuge and dissolved in 1300 lbs. of 60% $HNO_3$.

Although this invention has been illustrated by examples showing the conversion of plutonium phosphate to plutonium hydroxide, in the presence of a carrier consisting of a bismuth salt, the process of this invention is not limited to that modification. This process is equally applicable to the conversion of plutonium phosphate, $Pu_3(PO_4)_4$, to plutonium hydroxide, $Pu(OH)_4$, where the plutonium is present in such concentration that no carrier is needed to remove the plutonium precipitate from the supernatant liquid.

The use of an alkali metal hydroxide to furnish the hydroxide ion for conversion, as shown in the examples, is not intended to be a limitation on the process, since the hydroxide ion may also be furnished by the dissolution of a water soluble carbonate or bicarbonate in an aqueous medium.

While there have been described certain embodiments of this invention, it is to be understood that it is capable of many modifications. Changes, therefore, may be made without departing from the spirit and scope of the invention as described in the appended claims in which it is the intention to claim all novelty inherent in the invention as broadly as possible in view of the prior art.

What is claimed is:

1. The method of converting a bismuth phosphate carrier precipitate containing plutonium into a composition more easily soluble in acid, which comprises contacting in an aqueous medium said precipitate with a material of the group consisting of water-soluble carbonates, bicarbonates, and hydroxides and mixtures thereof, whereby the bismuth phosphate carrier precipitate is converted to a bismuth hydroxide precipitate containing plutonium, and separating said hydroxide from the aqueous medium.

2. The method of converting a bismuth phosphate carrier precipitate containing plutonium into a composition more easily soluble in acid which comprises contacting in an aqueous medium said precipitate with an alkali metal hydroxide, and separating the bismuth and plutonium hydroxides thus formed from the aqueous medium.

3. The method of converting a bismuth phosphate carrier precipitate containing plutonium into a composition more easily soluble in acid which comprises contacting in an aqueous medium said precipitate with potassium hydroxide, and separating the bismuth and plutonium hydroxides thus formed from the aqueous medium.

4. The method of converting a bismuth phosphate carrier precipitate containing plutonium into a composition more easily soluble in acid which comprises contacting in an aqueous medium said precipitate with a mixture of an alkali metal hydroxide and an alkali metal carbonate, and separating the bismuth and plutonium hydroxides thus formed from the aqueous medium.

5. The method of converting a bismuth phosphate carrier precipitate containing plutonium into a composition more easily soluble in acid which comprises contacting in an aqueous medium said precipitate with a mixture of potassium hydroxide and potassium carbonate, and separating the bismuth and plutonium hydroxides thus formed from the aqueous medium.

6. The method of converting plutonium phosphate into a plutonium compound more easily soluble in acid, which comprises contacting in an aqueous medium said composition with a material of the group consisting of water-soluble carbonates, bicarbonates, and hydroxides and mixtures thereof, and separating the quadrivalent plutonium hydroxide thus formed from the aqueous medium.

7. The method of converting plutonium phosphate into a plutonium composition more easily soluble in acid which comprises contacting said composition in an aqueous medium with KOH, and separating the plutonium hydroxide thus formed.

8. The method of converting a bismuth phosphate carrier precipitate containing plutonium and fission products to a composition more easily soluble in acid which comprises contacting in an aqueous medium said precipitate with at least a stoichiometric amount of potassium hydroxide, agitating said mixture until the bismuth phosphate is substantially converted to a bismuth hydroxide carrier containing plutonium, and separating said bismuth hydroxide carrier from the aqueous medium.

9. In a process for separating plutonium from contaminating agents wherein a bismuth phosphate carrier precipitate containing plutonium is obtained and the precipitate is dissolved, the steps in dissolving said precipitate which comprise contacting in an aqueous medium said precipitate with a material of the group consisting of water-soluble carbonates, bicarbonates, hydroxides and mixtures thereof, separating the bismuth hydroxide carrier containing plutonium thus formed from the aqueous medium and dissolving said hydroxide in an acid.

10. In the process for separating plutonium from contaminating agents wherein a bismuth phosphate carrier precipitate containing plutonium is obtained and the precipitate is dissolved, the steps in dissolving said precipitate which comprise contacting in an aqueous medium said precipitate with an alkali metal hydroxide, separating the bismuth hydroxide plutonium carrier precipitate thus formed from the aqueous medium and dissolving said hydroxide in an acid.

11. In a process for separating plutonium from uranium and fission products wherein a bismuth phosphate carrier precipitate containing plutonium is obtained and the precipitate is dissolved, the steps in dissolving said precipitate, which comprise contacting in an aqueous medium said precipitate with potassium hydroxide, separating the bismuth hydroxide plutonium carrier precipitate from the aqueous medium and dissolving said hydroxide in nitric acid.

References Cited in the file of this patent

UNITED STATES PATENTS 2,785,951   Thompson et al. _____ Mar. 19, 1957